United States Patent
Lee et al.

(10) Patent No.: US 12,167,332 B2
(45) Date of Patent: Dec. 10, 2024

(54) ELECTRONIC DEVICE MOUNTED ON VEHICLE AND OPERATION METHOD THEREOF

(71) Applicant: Samsung Electronics Co., Ltd., Gyeonggi-do (KR)

(72) Inventors: Jaewoong Lee, Gyeonggi-do (KR); Woong Lee, Gyeonggi-do (KR); Yuseon Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 349 days.

(21) Appl. No.: 17/684,644

(22) Filed: Mar. 2, 2022

(65) Prior Publication Data
US 2022/0295399 A1 Sep. 15, 2022

Related U.S. Application Data

(63) Continuation of application No. PCT/KR2022/002798, filed on Feb. 25, 2022.

(30) Foreign Application Priority Data

Mar. 2, 2021 (KR) ........................ 10-2021-0027492

(51) Int. Cl.
*H04W 52/02* (2009.01)
*B60L 50/60* (2019.01)
(Continued)

(52) U.S. Cl.
CPC ......... *H04W 52/0229* (2013.01); *B60L 50/60* (2019.02); *B60L 58/12* (2019.02);
(Continued)

(58) Field of Classification Search
CPC .. B60L 1/00; B60L 2240/622; B60L 2260/52; B60L 2260/54; B60L 50/60;
(Continued)

(56) References Cited

U.S. PATENT DOCUMENTS 10,500,973 B2 12/2019 Ji
11,109,308 B2 8/2021 Barany
(Continued)

FOREIGN PATENT DOCUMENTS

JP 2009-135706 A 6/2009
JP 6395921 B2 9/2018
(Continued)

OTHER PUBLICATIONS

International Search Report dated Jun. 10, 2022.
Extended European Search Report dated Jun. 7, 2024.

*Primary Examiner* — Timothy X Pham
(74) *Attorney, Agent, or Firm* — Cha & Reiter, LLC

(57) ABSTRACT

Provided are an electronic device mounted on a battery powered electric vehicle and an operation method thereof. The electronic device may calculate estimated battery consumption for the vehicle to be driven to a destination, identify a current remaining capacity of the battery, and determine, based at least in part on the identified remaining capacity of the battery and the estimated battery consumption, whether to switch from a first communication mode (e.g., a fifth generation (5G) millimeter wave (mmWave)) in current use, to a second communication mode that consumes battery power at a different rate.

14 Claims, 10 Drawing Sheets

(51) Int. Cl.
*B60L 58/12* (2019.01)
*H04B 1/3822* (2015.01)
*H04W 4/021* (2018.01)
*H04W 88/06* (2009.01)

(52) U.S. Cl.
CPC .......... *H04B 1/3822* (2013.01); *H04W 4/021* (2013.01); *H04W 88/06* (2013.01)

(58) Field of Classification Search
CPC ... B60L 58/12; H02J 2310/48; H02J 7/00032; H02J 7/0048; H02J 7/00712; H04B 1/3822; H04W 4/021; H04W 4/023; H04W 4/40; H04W 48/18; H04W 52/0229; H04W 88/06
See application file for complete search history.

(56) References Cited

U.S. PATENT DOCUMENTS

| | | | |
|---|---|---|---|
| 2010/0121590 A1 | 5/2010 | Kato | |
| 2015/0026312 A1 | 1/2015 | Othmer et al. | |
| 2018/0236898 A1 | 8/2018 | Ji | |
| 2020/0077328 A1 | 3/2020 | Barany | |
| 2020/0160619 A1* | 5/2020 | Wang | G06N 20/00 |
| 2022/0116863 A1* | 4/2022 | Nakagawa | H04W 48/18 |

FOREIGN PATENT DOCUMENTS

| | | |
|---|---|---|
| JP | 2020-150296 A | 9/2020 |
| KR | 10-0273536 B1 | 1/2001 |
| KR | 10-2013-0033546 A | 4/2013 |
| KR | 10-2018-0028421 A | 3/2018 |
| KR | 10-2018-0096898 A | 8/2018 |

\* cited by examiner

ELECTRONIC DEVICE MOUNTED ON VEHICLE AND OPERATION METHOD THEREOF

CROSS-REFERENCE TO RELATED APPLICATION(S)

This application is a continuation of International Application No. PCT/KR2022/002798, filed on Feb. 25, 2022, which claims priority to Korean Patent Application No. 10-2021-0027492, filed on Mar. 2, 2021 in the Korean Intellectual Property Office, the disclosures of which are herein incorporated by reference.

BACKGROUND

1. Technical Field

This disclosure relates to generally to an electronic device mounted on a battery powered electric vehicle and an operation method of the electronic device.

2. Description of Related Art

In recent years, unlike internal combustion engine vehicles using a powertrain such as a gasoline engine or a diesel engine, battery powered electric vehicles have proliferated. The electric vehicle's battery provides power to operate both the vehicle's driving and computing system and various electronic systems inside the vehicle. Thus, for stable driving, electric vehicles need to effectively control battery consumption for the driving system and the other internal electronic systems.

Recently, in a vehicle equipped with an electronic device for radio frequency (RF) communication, vehicle-to-everything (V2X) communication has been used to enable high-speed data communication. V2X communication requires low latency and high data rates to perform data transmission and reception for autonomous driving of the vehicle, high-definition (HD) map data (e.g., an HD map) updates, or over-the-air (OTA) vehicle operating system updates. In particular, high data rates and low latency are required for autonomous driving of a vehicle because the vehicle needs to exchange data in real time with a camera, a light detection and ranging (LIDAR) sensor, a radio detection and ranging (RADAR) sensor, or a server in order to improve a recognition rate of the surrounding environment, such as a road on which the vehicle is traveling, or nearby vehicles.

To achieve high data rates and low latency, V2X communication uses fifth generation (5G) mobile communication. Requirements of 5G mobile communication may include high data rates (e.g., enhanced mobile broadband (eMBB)), ultra-low latency (ultra-reliable low latency communications (URLLC)), the ability to handle a large number of devices (enhanced machine type communications (eMTC)), high reliability, energy efficiency, and the like. To satisfy these requirements, V2X communication uses a 5G millimeter wave (mmWave)-based wireless communication mode. This mode provides high data rates, ultra-low latency, and high-speed data services compared to existing communication modes such as third generation (3G), long-term evolution (LTE), or 5G sub 6, but has the drawback of high battery consumption. In particular, for an electric vehicle with a battery therein used for both driving and RF communication, continuous use of a 5G mmWave-based communication mode that consumes excessive battery power may shorten a driving distance and/or limit driving speed.

SUMMARY

Provided are an electronic device and an operation method thereof, which allow an electric vehicle to stably maintain a remaining battery capacity at or above an appropriate level even while communicating in a relatively high battery power consumption RF communication mode, e.g., a 5G mmWave communication mode, when travelling to a destination. Also provided are an electronic device and an operation method thereof, which determine whether to switch from a relatively high battery power consumption RF communication mode to a lower power consumption communication mode based on estimated battery consumption for the vehicle to travel to a target destination and a current remaining battery capacity.

According to an embodiment of the disclosure, an electronic device mountable to a vehicle is provided. According to an embodiment of the disclosure, the electronic device includes: battery capacity identifying circuitry configured to identify a remaining capacity of a battery that supplies power for driving the vehicle; radio frequency (RF) communication circuitry configured to perform data communication using at least one of a plurality of different communication modes; a memory storing at least one instruction; and a processor configured to execute the at least one instruction to: calculate estimated battery consumption for the vehicle to be driven to a set destination; obtain information about a current remaining capacity of the battery from the battery capacity identifying circuitry; determine, based at least in part on the obtained information and the estimated battery consumption, whether to switch from a first communication mode, (e.g., 5GmmWave) in current use, to a second communication mode that consumes battery power at a different rate; and control the RF communication circuitry to perform data communication by using the first or second communication mode according to a result of the determination.

In some embodiments:

The electronic device may further include a user interface configured to receive a user input for inputting information about a destination, and the processor may be further configured to set the destination based on the user input received via the user interface.

The processor may be further configured to calculate first estimated battery consumption, which is battery consumption expected by a power unit of the vehicle for the vehicle to travel to the destination and second estimated battery consumption, which is battery consumption expected by other vehicular electronic devices operated by a passenger while the vehicle travels from an origin to the designation.

The processor may be further configured to compare the identified remaining capacity of the battery with the calculated estimated battery consumption, which includes an expected battery consumption for use of the first communication mode, and determine, based on a result of the comparing, whether to maintain the first communication mode or switch from the first communication mode to the second communication mode.

The processor may be further configured to determine to switch from the first communication mode to the second communication mode when, as a result of the comparing, the current remaining capacity of the battery is less than the sum of the calculated estimated battery consumption and the expected battery consumption for use of the first communication mode, the first communication mode is 5G mmWave, and the second communication mode is one of 5G sub6, long-term evolution (LTE), and third generation (3G) communication modes.

The processor may be further configured to disable an operation of 5G mmWave communication circuitry included in the RF communication circuitry, when switching from the first communication mode to the second communication mode.

The processor may be further configured to determine to maintain the first communication mode when, as a result of the comparing, the current remaining capacity of the battery equals or exceeds the sum of the calculated estimated battery consumption and the expected battery consumption for use of the first communication mode.

The processor may be further configured to monitor qualities of communication networks respectively using the first and second communication modes and determine to switch from the first communication mode to the second communication mode based on a result of the monitoring.

The processor may be further configured to display, on a center information display (CID) within the vehicle, a graphical user interface (GUI) configured to receive a user input for changing a communication mode and switch the communication mode based on the user input received via the GUI.

The electronic device may further include a user interface configured to receive a user input for determining a priority between driving of the vehicle at a relatively low overall battery consumption rate and data communication speed, and the processor may be further configured to determine the priority among the driving of the vehicle and the data communication speed and determine whether to switch a communication mode based on the identified remaining capacity of the battery, the estimated battery consumption, and the priority.

According to another embodiment of the disclosure, an operation method of an electronic device mounted on a battery powered vehicle is provided. The operation method includes: calculating estimated battery consumption for the vehicle to be driven to a destination; identifying a current remaining capacity of the battery; and determining, based on the identified current remaining capacity of the battery and the estimated battery consumption, whether to switch from a first communication mode (e.g., 5G mmWave) in current use, to a second communication mode that consumes battery power at a different rate.

In an embodiment of the disclosure, the operation method further includes operations analogous to those delineated above in connection with an embodiment of an electronic device according to the disclosure.

According to another embodiment of the disclosure, a computer-readable recording medium having recorded thereon a program to be executed on a computer to implement the above-summarized method is provided.

DETAILED DESCRIPTION OF EMBODIMENTS

Figure 1:
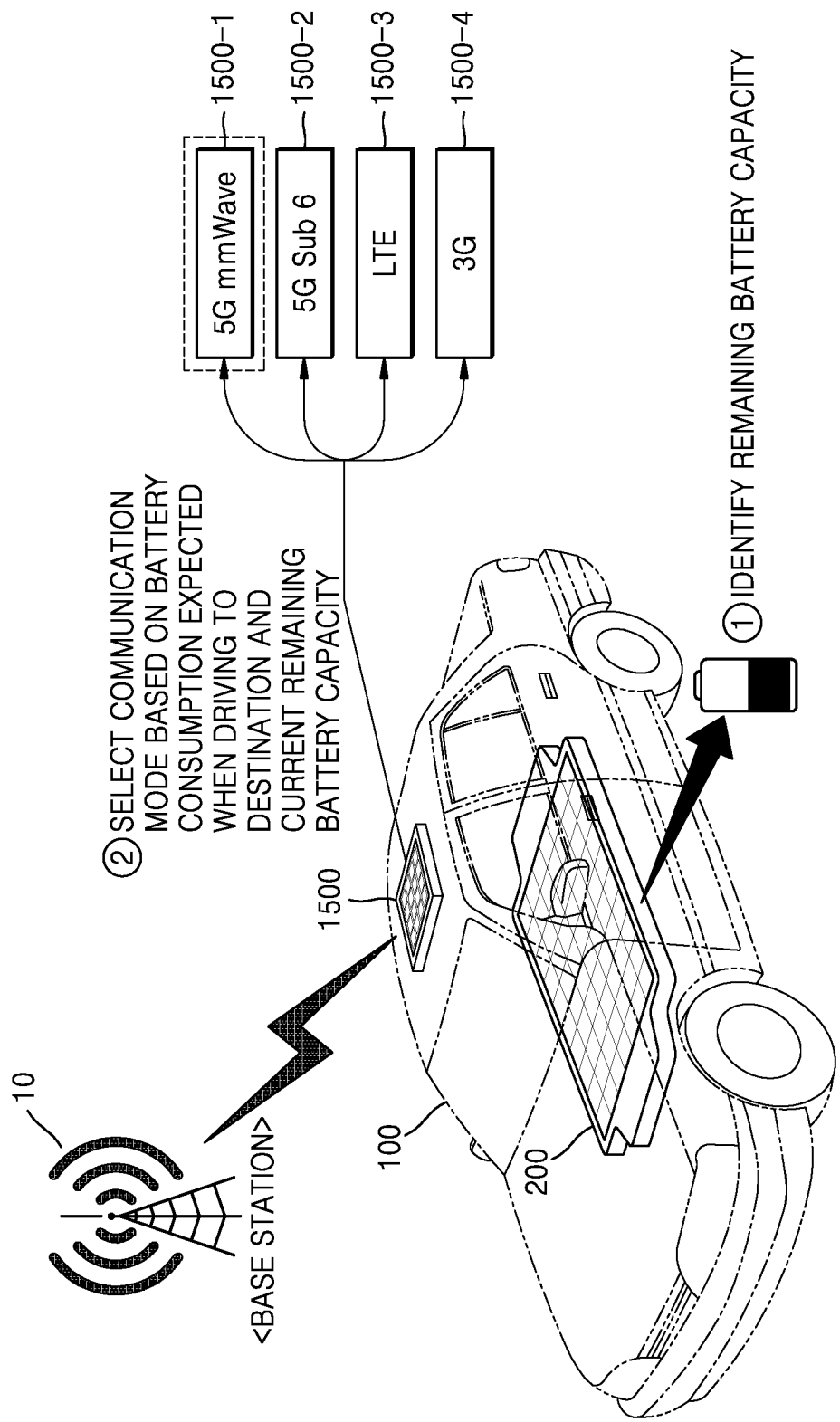
FIG. 1 is a conceptual diagram for describing an operation method of an electronic device, according to an embodiment of the disclosure.

Throughout the disclosure, the expression "at least one of a, b or c" indicates only a, only b, only c, both a and b, both a and c, both b and c, all of a, b, and c, or variations thereof.

As the terms used herein, general terms that are currently widely used are selected by taking functions in the disclosure into account, but the terms may have different meanings according to an intention of one of ordinary skill in the art, precedent cases, advent of new technologies, etc. Furthermore, specific terms may be arbitrarily selected by the applicant, and in this case, the meaning of the selected terms will be described in detail in the detailed description of a corresponding embodiment. Thus, the terms used herein should be defined not by simple appellations thereof but based on the meaning of the terms together with the overall description of the disclosure.

Singular expressions used herein are intended to include plural expressions as well unless the context clearly indicates otherwise. All the terms used herein, which include technical or scientific terms, may have the same meaning that is generally understood by a person of ordinary skill in the art.

Throughout the disclosure, when a part "includes" or "comprises" an element, unless there is a particular description contrary thereto, the part may further include other elements, not excluding the other elements. Furthermore, terms, such as "portion," "module," etc., used herein indicate a unit for processing at least one function or operation and may be embodied as hardware or software or a combination of hardware and software.

The expression "configured to (or set to)" used herein may be used interchangeably, according to context, with, for example, the expression "suitable for," "having the capacity to," "designed to," "adapted to," "made to," or "capable of". The term "configured to (or set to)" may not necessarily mean only "specifically designed to" in terms of hardware. Instead, the expression "a system configured to" may mean, in some contexts, the system being "capable of", together with other devices or components. For example, the expression "a processor configured to (or set to) perform A, B, and C" may mean a dedicated processor (e.g., an embedded processor) for performing the corresponding operations or a general-purpose processor (e.g., a central processing unit (CPU) or an application processor (AP)) capable of performing the corresponding operations by executing one or more software programs stored in a memory.

As used herein, the term 'vehicle' refers to a vehicle that travels on a road by using electrical energy from an electricity supply source as a power source. In particular, in this specification, a vehicle refers to a battery powered electric vehicle that is driven using electrical energy provided by a battery as a power source. It is assumed that the battery also powers RF communication electronics within/mounted to the vehicle for RF communication between the vehicle user and external sources.

FIG. 1 is a conceptual diagram for describing an operation method of an electronic device 1000 (shown schematically in FIG. 2) mounted on a vehicle 100 according to an embodiment of the disclosure. The electronic device 1000 includes RF communication circuitry 1500 shown in FIG. 1, as well as a processor and other circuitry mounted on the vehicle 100. FIG. 1 illustrates an embodiment of the disclosure in which the electronic device 1000 mounted on the vehicle 100 identifies a current remaining capacity of a battery 200 and selects and switches a communication mode based on estimated battery consumption for the vehicle 100 to travel to a destination and the current remaining capacity of the battery 200.

As shown in FIG. 1, the battery 200 is installed inside the vehicle 100. The battery 200 supplies power necessary for operations of the electronic device 1000 and a power unit for driving the vehicle 100. The battery 200 may be configured as a rechargeable primary or secondary battery. The battery 200 may be configured as, for example, a lithium (Li)-ion battery, a Li-ion polymer battery (LIPB), a nickel (Ni)-cadmium (Cd) battery, or a Ni-metal hydride (MH) battery, but is not limited thereto.

The electronic device 1000 may be mounted on an external structure of the vehicle 100 or arranged in the vehicle 100. (Since the electronic device 1000 may include a graphical user interface, in this case, a portion of the electronic device 1000 is arranged within the vehicle and another portion, e.g., the RF communication circuitry 1500 discussed below, may be mounted on the external structure. Herein, an electronic device "mounted on" the vehicle is understood to mean mounted on an internal and/or external surface of the vehicle.) In the embodiment of the disclosure shown in FIG. 1, the electronic device 1000 may be arranged partially on a metal structure constituting a roof of the vehicle 100.

The electronic device 1000 may include radio frequency (RF) communication circuitry (interchangeably, "module") 1500 that is communicatively connected to a base station 10 and performs data transmission and reception to and from the base station 10. The RF communication module 1500 may perform data communication with the base station 10 using at least one of a fifth generation (5G) millimeter wave (mmWave) communication mode 1500-1, a 5G sub6 communication mode 1500-2, a long-term evolution (LTE) communication mode 1500-3, or third generation (3G) communication mode 1500-4. The RF communication module 1500 may perform data communication with the base station 10 as well as a server or another electronic device.

The electronic device 1000 may identify a current remaining capacity of the battery 200, i.e., a remaining battery level, and calculate estimated battery consumption, which is battery consumption expected for the vehicle 100 to travel to the destination. The electronic device 1000 may calculate total estimated battery consumption by summing together estimated battery consumption of the power unit for driving the vehicle 100, estimated battery consumption of the RF communication module 1500 when performing data communication, and estimated battery consumption for operations of other electronic systems within the vehicle 100. In particular, the electronic device 1000 may calculate estimated battery consumption for driving the vehicle 100 to the destination. In some examples, the calculated estimated battery consumption of the RF communication module 1500 is a maximum battery consumption expected for a user during an expected travel time to the destination. A maximum battery consumption may correspond to the user being in continual communication using the RF communication module 1500 during the expected travel time.

The electronic device 1000 may select, based on a current remaining capacity of the battery 200 and estimated battery consumption, one of a plurality of communication modes, e.g., the 5G mmWave communication mode 1500-1, the 5G sub6 communication mode 1500-2, the LTE communication mode 1500-3, and the 3G communication mode 1500-4. The electronic device 1000 may set the 5G mmWave communication mode 1500-1 as a default mode for a wireless network (default setting), compare a current remaining capacity of the battery 200 with an estimated total battery consumption, and determine, based on a result of the comparison, whether to switch the 5G mmWave communication mode 1500-1 to at least one of the 5G sub6 communication mode 1500-2, the LTE communication mode 1500-3, or the 3G communication mode 1500-4. The 5G mmWave communication mode 1500-1 may consume the battery 200's power at a higher rate than that of any of the other communication modes 1500-2 to 1500-4.

Unlike in an internal combustion engine vehicle, in the case of an electric vehicle that uses the battery 200 to not only drive the vehicle 100 but also operate various electronic systems inside the vehicle 100, it is necessary to effectively control battery consumption of a driving device and other internal electronic system for stable driving. Furthermore, recent V2X communication uses the 5G mmWave communication mode 1500-1 which is capable of achieving high data rates (eMBB), ultra-low latency (URLLC), the ability to handle a large number of devices (eMTC), high reliability, etc. for data transmission and reception for autonomous driving of the vehicle 100, HD map data (e.g., an HD map) updates, or over-the-air (OTA) vehicle operating system updates. Because a 5G mmWave communication module (1510 of FIG. 2) for performing 5G mmWave communication performs beamforming via a plurality of patch antennas, and each of the patch antennas includes a power amplifier, the 5G mmWave communication consumes a relatively large amount of power compared to other communication methods (e.g.,5G sub6, LTE, or 3G communication). Thus, when the electronic device 1000 continuously uses the 5G mmWave communication mode 1500-1, the power consumption rate of the battery 200 is high (battery efficiency is reduced), and when a remaining capacity of the battery 200 decreases, a problem may arise in that the vehicle 100 is unable to drive to a destination due to the battery 200 becoming depleted.

To resolve such problems, the electronic device 1000 may identify a current remaining capacity of the battery 200, calculate estimated battery consumption for driving the vehicle 100 to a destination, and determine, based on the current remaining capacity of the battery 200 and the estimated battery consumption, whether to use the 5G mmWave communication mode 1500-1, or another communication mode having a lower power consumption rate, e.g., the 5G sub6 communication mode 1500-2, the LTE communication mode 1500-3, or the 3G communication mode 1500-4. When the estimated battery consumption for driving to the destination is lower than the current remaining capacity of the battery 200, the electronic device 1000 may determine to maintain the 5G mmWave communication mode 1500-1, and when the estimated battery consumption equals or exceeds the current remaining capacity of the battery 200, the electronic device 1000 may determine to switch the 5G mmWave communication mode 1500-1 to the 5G sub6 communication mode 1500-2, the LTE communication mode 1500-3, or the 3G communication mode 1500-4. By doing so, the electronic device 1000 of the disclosure may efficiently and stably manage the capacity of the battery 200 and ensure that a target destination will be reached.

In addition, because the electronic device 1000 of the disclosure may adaptively change a communication mode based on the remaining capacity of the battery 200 and the estimated battery consumption, power consumption may be reduced and accordingly efficiency may be improved when not using the 5G mmWave communication mode 1500-1, while maintaining merits of the 5G mmWave communication mode 1500-1, such as high data rates (eMBB), ultra-low latency (URLLC), or the ability to handle a large number of devices (eMTC).

Figure 2:
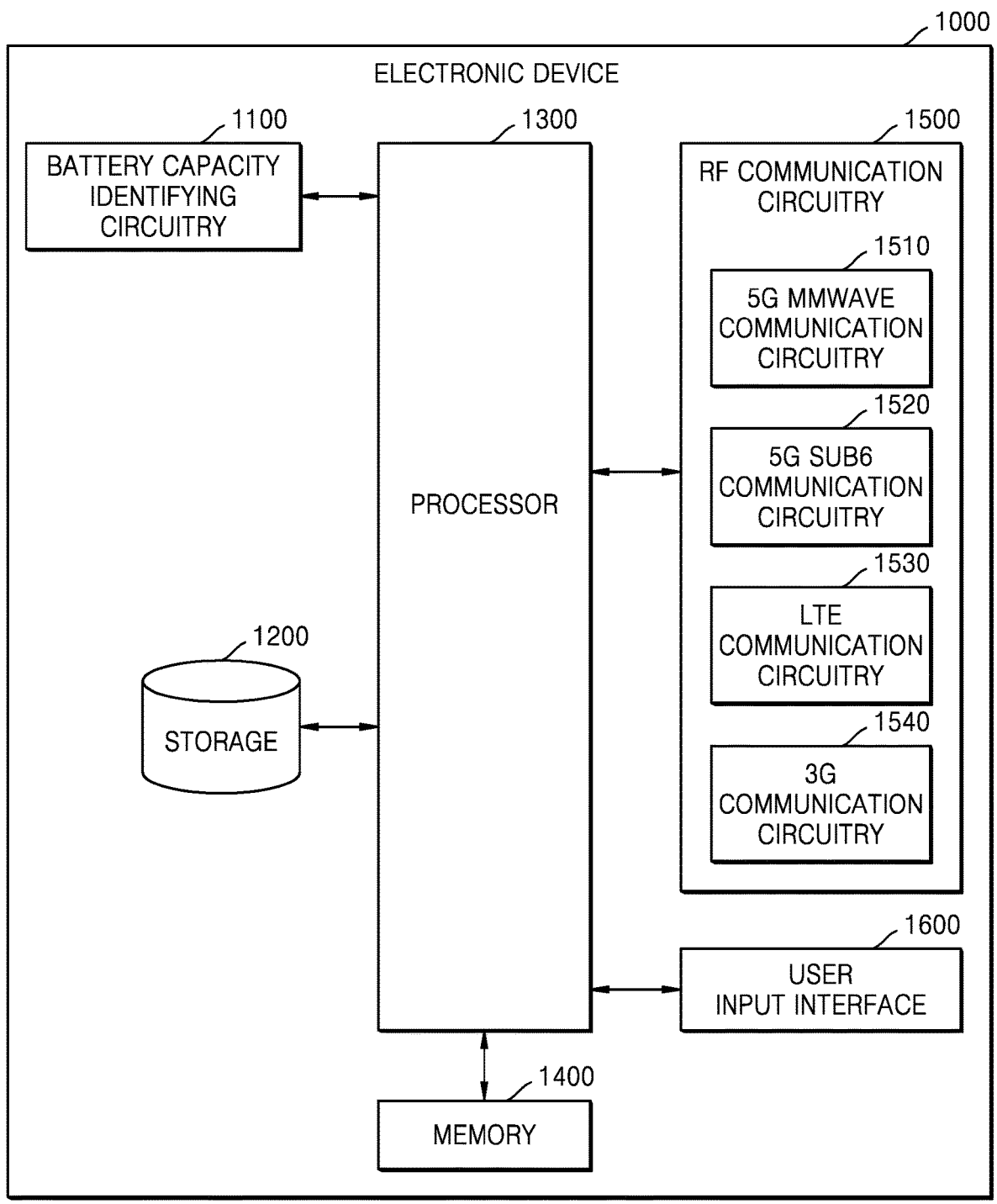
FIG. 2 is a block diagram of components of an electronic device according to an embodiment of the disclosure.

FIG. 2 is a block diagram of example components of an electronic device 1000 according to an embodiment of the disclosure. A portion of electronic device 1000 may be mounted on an external structure of the vehicle (100 of FIG. 1). A portion of the electronic device 1000 may be arranged, for example, on one of a metal structure constituting a roof of the vehicle 100, a bonnet, a bumper, a pillar, and a trunk. However, embodiments of the disclosure are not limited thereto, and the electronic device 1000 may be completely located inside the vehicle 100.

Referring to FIG. 2, the electronic device 1000 may include battery capacity identifying circuitry 1100, a storage 1200, a processor 1300, a memory 1400, RF communication circuitry 1500, and a user interface 1600. The battery capacity identifying circuitry 1100, the storage 1200, the processor 1300, the memory 1400, the RF communication circuitry 1500, and the user interface 1600 may be electrically and/or physically connected to one another. The components illustrated in FIG. 2 are merely an embodiment of the disclosure, and components included in the electronic device 1000 are not limited to those illustrated in FIG. 2. The electronic device 1000 may not include some of the components shown in FIG. 2, and further include components not shown in FIG. 2. Herein, the term "module" may be used interchangeably with "circuitry". "Circuitry" herein may include special purpose circuitry, or in some cases, general purpose processing circuitry that reads instructions from a memory to implement the functionality described herein in association with the circuitry.

The battery capacity identifying module 1100 is configured to monitor a remaining capacity of the battery (200 of FIGS. 1 and 3) inside the vehicle 100. The battery capacity identifying module 1100 may monitor the remaining capacity of the battery 200 in real-time and provide information about the monitored remaining capacity to the processor 1300. The battery capacity identifying module 1100 may identify the current remaining capacity of the battery 200. In this case, the 'current remaining capacity' refers to the remaining capacity of the battery 200 at a time point when a destination for driving is set. The destination for driving may be set by the user, but is not limited thereto. The destination may be automatically set, or may be automatically set by an artificial intelligence (AI) model as a frequently visited destination (e.g., home, a school, or a work).

The storage 1200 stores information about the amount of power consumed by each component of the vehicle 100. In an embodiment of the disclosure, the storage 1200 stores information about power consumption of at least one of a power unit (300 of FIG. 3) for driving the vehicle 100 (e.g., an electric motor, etc.), other vehicular electronic devices (400 of FIG. 3) provided in the vehicle 100 for user convenience, or the RF communication module 1500. The power consumption may be stored, for example, as a value in kilowatt hour (kWh) obtained by multiplying the amount of power in kW by the amount of time. Information about the power consumption of each of the power unit 300, the other vehicular electronic devices 400, and the RF communication module 1500 may be stored in the storage 1200 in the form of a lookup table (LUT).

The processor 1300 may execute one or more instructions of a program stored in the memory 1400. The processor 1300 may be composed of hardware components that perform arithmetic, logical, and input/output (I/O) operations, and signal processing. For example, the processor 1300 may be comprised of at least one of a CPU, a microprocessor, a graphics processing unit (GPU), an AP, application specific integrated circuits (ASICs), digital signal processors (DSPs), digital signal processing devices (DSPDs), programmable logic devices (PLDs), or field programmable gate arrays (FPGAs), but is not limited thereto.

In an embodiment of the disclosure, the processor 1300 may also be composed of dedicated hardware chips for performing AI learning.

The memory 1400 may include, for example, a non-volatile memory including at least one of a flash memory-type memory, a hard disk-type memory, a multimedia card micro-type memory, a card-type memory (e.g., an SD card or an XD memory), read-only memory (ROM), electrically erasable programmable ROM (EEPROM), or PROM, and a volatile memory such as random access memory (RAM) or static RAM (SRAM).

The memory 1400 may store instructions, data structures, and program code that are readable by the processor 1300. In embodiments of the disclosure set forth below, the processor 1300 may be implemented by executing instructions or code of a program stored in the memory 1400.

The processor 1300 may calculate battery consumption expected to be required when the vehicle 100 travels to the set destination, identify a current remaining capacity of the battery 200 200 inside the vehicle 100, and determine, based on the current remaining capacity of the battery 200 and the estimated battery consumption, whether to switch a 5G mmWave RF communication mode that is being used to one of 5G sub6, LTE, and 3G communication. The processor 1300 may control the RF communication module 1500 to perform data communication using a communication mode selected according to a result of the switching.

The processor 1300 may obtain, from the battery capacity identifying module 1100, information about the current remaining capacity of the battery 200 inside the vehicle 100.

The processor 1300 may calculate estimated battery consumption that is battery consumption expected to be required when the vehicle 100 is driven to a set destination. The processor 1300 may calculate, based on a distance between an origin and the destination and power consumption of the power unit 300, first estimated battery consumption that is battery consumption expected to be required by the power unit 300 of the vehicle 100 when the vehicle 100 moves to the destination. The processor 1300 may calculate the first estimated battery consumption by taking into account variables associated with traffic information (e.g., traffic congestion, accidents, etc.) related to a route to the destination.

The processor 1300 may calculate second estimated battery consumption that is battery consumption expected to be required by the other vehicular electronic devices 400 operated by a passenger while the vehicle 100 moves from the origin to the destination. The processor 1300 may calculate the second estimated battery consumption based on a type of the other vehicular electronic devices 400 used by a driver, a front seat passenger, and/or a rear seat passenger and power consumption thereof according to usage time. The storage 1200 may store usage history information regarding a type and usage time of the other vehicular electronic devices 400 frequently used by the driver, the front passenger seat, and/or the rear seat passenger. The processor 1300 may calculate the second estimated battery consumption based on the usage history information provided from the storage 1200.

When data communication is performed by each of a plurality of communication modules, i.e., the 5G mmWave communication module 1510, a 5G sub6 communication module 1520, an LTE communication module 1530, and a 3G communication module 1540, included in the RF communication module 1500, the processor 1300 may calculate third estimated battery consumption for driving the vehicle 100 to the destination.

The processor 1300 may calculate total estimated battery consumption for driving the vehicle 100 to the destination, based on the first estimated battery consumption, the second estimated battery consumption, and the third estimated battery consumption.

The processor 1300 may obtain information about power consumption of each of the power unit 300, the other vehicular electronic devices 400, and the RF communication module 1500, which is stored in the storage 1200, and calculate estimated battery consumption based on the obtained information about power consumption. The processor 1300 may calculate estimated battery consumption for moving the vehicle 100 to the destination, based on a total capacity of the battery 200, the current remaining capacity of the battery 200 obtained from the battery capacity identifying module 1100, and information about power consumption of each component, which is obtained from the storage 1200.

The processor 1300 may compare the current remaining capacity of the battery 200, which is obtained from the battery capacity identifying module 1100, with the estimated battery consumption, and determine, based on a result of the comparison, whether to maintain the 5G mmWave communication mode or switch a communication mode to the 5G sub6, LTE, or 3G communication mode. In an embodiment of the disclosure, the processor 1300 may set the 5G mmWave communication mode as a default setting value, and control the RF communication module 1500 to perform data communication preferentially using the 5G mmWave communication mode. In an embodiment of the disclosure, the processor 1300 may compare the current remaining capacity of the battery 200 with a sum of the first estimated battery consumption, the second estimated battery consumption, and the estimated battery consumption of the 5G mmWave communication module 1510, and determine, based on a result of the comparison, whether to switch a communication mode. As a result of the comparison, when the current remaining capacity of the battery 200 is less than the sum of the first estimated battery consumption, the second estimated battery consumption, and the estimated battery consumption of the 5G mmWave communication module 1510, the processor 1300 may switch a communication mode so as to use one of the 5G sub6, LTE and 3G communication. In this case, the processor 1300 may switch an operation mode of the 5G mmWave communication module 1510 to a power saving mode, or disable an operation of the 5G mmWave communication module 1510.

On the other hand, when the current remaining capacity of the battery 200 is greater than or equal to the sum of the first estimated battery consumption, the second estimated battery consumption, and the estimated battery consumption of the 5G mmWave communication module 1510, the processor 1300 may determine to maintain the 5G mmWave communication mode.

In an embodiment of the disclosure, the processor 1300 may monitor a communication network quality for each of the communication modules, i.e., the 5G mmWave communication module 1510, the 5G sub6 communication module 1520, the LTE communication module 1530, and the 3G communication module 1540 included in the RF communication module 1500, and determine whether to switch the communication mode based on a result of the monitoring. In an embodiment of the disclosure, the processor 1300 monitor a quality of a communication network using the 5G mmWave communication module 1510 and qualities of communication networks respectively using the 5G sub6 communication module 1520, the LTE communication module 1530, and the 3G communication module 1540, and determine whether to switch a 5G mmWave communication mode that is being used to another communication mode.

In an embodiment of the disclosure, the processor 1300 may switch a communication mode based on a user input received via the user interface 1600. An embodiment of the disclosure in which a communication mode is switched based on a user input will be described in detail with reference to FIG. 6.

In an embodiment of the disclosure, the processor 1300 may determine whether to switch the communication mode according to a priority between driving of the vehicle 100 at a relatively low overall battery consumption rate, and speed of data communication. An embodiment of the disclosure in which a communication mode is switched according to such a priority will be described in detail with reference to FIG. 7.

The RF communication module 1500 is connected to a base station and configured to transmit or receive data to/from the base station. The RF communication module 1500 may perform data communication with a server, an electronic device mounted on another vehicle, or a passenger's mobile device. In an embodiment of the disclosure, the RF communication module 1500 may be connected to the base station or server to transmit and receive data for autonomous driving of the vehicle 100, or receive HD map data (e.g., an HD map) updates or OTA vehicle operating system updates. In an embodiment of the disclosure, the RF communication module 1500 may be wirelessly connected to a mobile device of a passenger riding in the vehicle 100 and may function as a communication relay for relaying data communication with the mobile device.

The RF communication module 1500 may include at least one of an antenna, an RF circuit capable of implementing at least one communication protocol, or an RF device to perform wireless data communication. In an embodiment of the disclosure, the RF communication module 1500 may include at least one external antenna for wireless communication with a base station and at least one internal antenna for wireless communication with a mobile device of a passenger in the vehicle 100.

The RF communication module 1500 may select one of a plurality of communication protocols according to control by the processor 1300. In an embodiment of the disclosure, the RF communication module 1500 may include the 5G mmWave communication module 1510, the 5G sub6 communication module 1520, the LTE communication module 1530, and the 3G communication module 1540.

The user interface (UI) 1600 is configured to receive various user inputs. In an embodiment of the disclosure, the UI 1600 may receive a user input for setting a destination via a navigation system (420 of FIG. 3). In an embodiment of the disclosure, the UI 1600 may receive a user input for changing a communication mode. The UI 1600 may receive a user input for determining a priority between driving of the vehicle 100 at a relatively low overall battery consumption rate, and data communication speed.

The UI 1600 may receive a user input via, for example, a button, a keypad, a trackball, a jog switch, a jog dial, a knob, or the like, or a drag input, a swipe input, a touch input for touching a touch pad or a touch screen, a drag input, a swipe input, etc. When the UI 1600 receives a touch input, it may be configured as a touch screen including a touch pad. In this case, the touch screen may display a graphical user interface (GUI) for receiving a user input.

Figure 3:
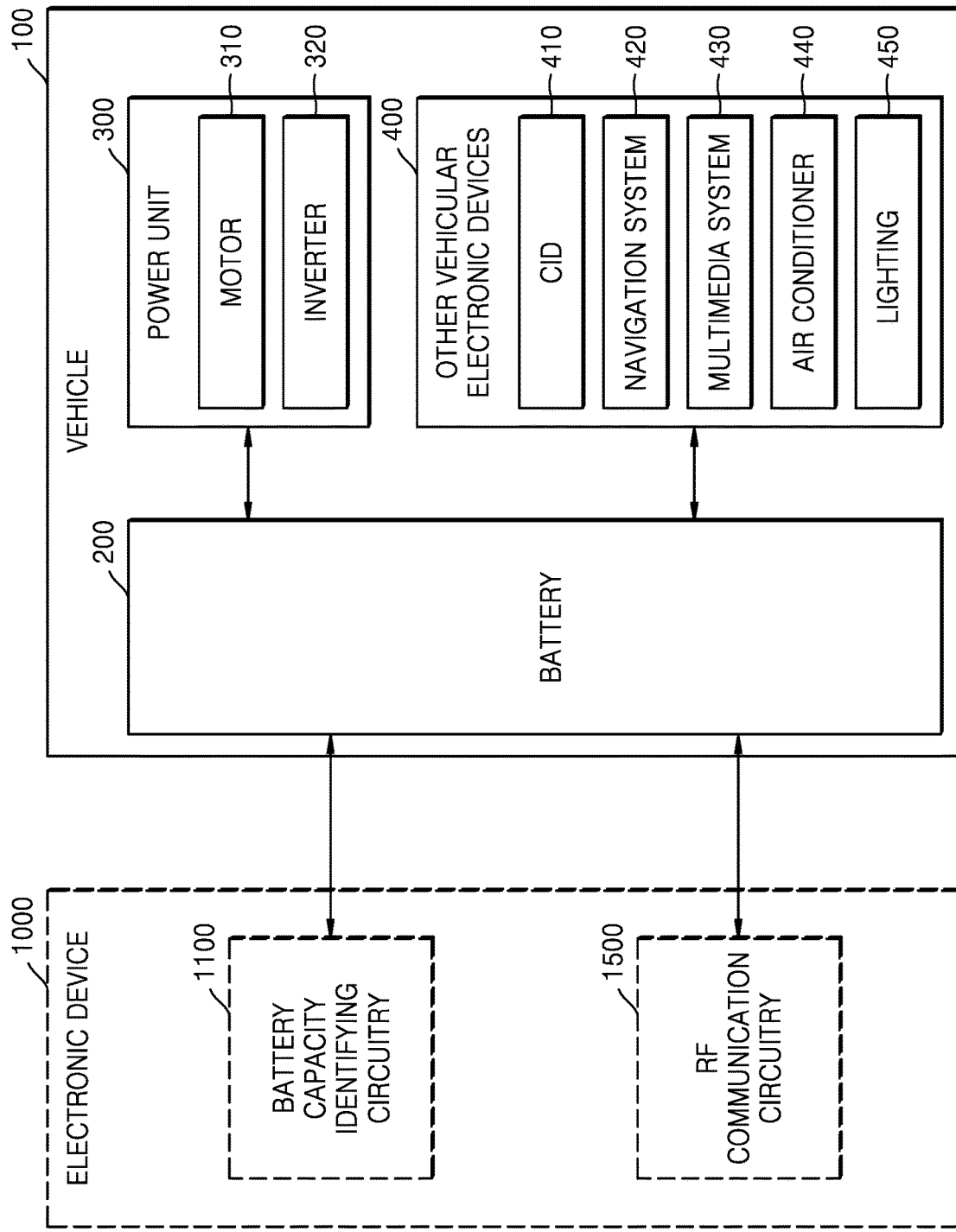
FIG. 3 is a block diagram of a battery inside a vehicle and components for receiving power from the battery according to an embodiment of the disclosure.

FIG. 3 is a block diagram of a configuration of a vehicle 100 according to an embodiment of the disclosure. An electronic device 1000 shown in FIG. 3 is substantially the same as the electronic device 1000 of FIG. 2, except that it includes only the battery capacity identifying module 1100 and the RF communication module 1500. Thus, descriptions that are already provided above with respect to FIG. 2 will be omitted below.

Referring to FIG. 3, the vehicle 100 may include a battery 200, a power unit 300, and other vehicular electronic devices 400. The vehicle 100 of FIG. 3 is an electric vehicle that runs using power stored in the battery 200. The components shown in FIG. 3 are merely an example of the components included in the vehicle 100, and the components included in the vehicle 100 are not limited to those illustrated in FIG. 3.

The battery 200 is configured to supply power for operations of the power unit 300, the other vehicular electronic devices 400, and the RF communication module 1500. The battery 200 is configured as a rechargeable secondary battery. For example, the battery 200 may be configured as a Li-ion battery, a LIPB, a Ni—Cd battery, or a Ni-MH battery, but is not limited thereto. The battery capacity identifying module 1100 of the electronic device 1000 may monitor a remaining capacity of the battery 200 in real-time.

The power unit 300 is a component that provides power for driving the vehicle 100, and includes a motor 310 and an inverter 320. The motor 310 generates a driving force by using supply power applied from the battery 200. The motor 310 may drive the vehicle 100 by connecting a decelerator to a shaft to transmit torque to wheels. In an embodiment of the disclosure, the motor 310 may be configured as an interior permanent magnet synchronous motor (IPMSM) having a permanent magnet embedded inside a rotor, or an induction motor, but is not limited thereto. The motor 310 may be configured as, for example, an excited wound-field synchronous motor (WFSM), a reluctance motor (a synchronous reluctance motor (SynRM), a switched reluctance motor (SRM), or a permanent magnet assisted SynRM (PMaSynRM)), or the like. The inverter 320 is a power conversion device that controls a speed or torque of the motor 310 by converting direct current (DC) power from the battery 200 into alternating current (AC) power.

The other vehicular electronic devices 400 may include a central information display (CID) 410, a navigation system 420, a multimedia system 430, an air conditioner 440, and a lighting 450.

The CID 410 is a display located on a dashboard or a center console inside the vehicle 100. The CID 410 may display information such as navigation information, vehicle state information, and vehicle internal or external temperature. In an embodiment of the disclosure, the CID 410 may display a GUI for receiving a user input for entering a destination.

The navigation system 420 is configured to provide various pieces of information for driving to a destination. The navigation system 420 provides a vehicle location calculation function for calculating a location of the vehicle 100 using a GPS satellite or an autonomous navigation sensor, a route search function for searching for an optimal route to a destination, a route guidance function for guiding the vehicle 100 to a found route, etc. In an embodiment of the disclosure, the navigation system 420 may set a destination based on a user input. However, embodiments of the disclosure are not limited thereto, and the navigation system 420 may store identification values (e.g., identification numbers in a favorites list) for frequently visited destinations, such as home, work, school, etc., and location information of the frequently visited destinations, automatically determine a destination based on information about a current location or a time period (e.g., commuting time to and from work, commuting time to and from school, or the like), and search for a route to the determined destination.

The multimedia system 430 is configured to play audio data or video data that is recorded on a compact disc (CD), a digital versatile disc (DVD), a Blu-ray disc, universal serial bus (USB) memory, etc. or is streamed from a mobile device connected using wireless data communication such as Bluetooth, and play digital broadcasting, radio broadcasting, etc.

The air conditioner 440 is configured to control the internal temperature of the vehicle 100 by providing air cooling or heating services.

The lighting 450 includes lamps such as a headlamp, a rear combination lamp, and a fog lamp outside the vehicle 100, and an interior lighting lamp inside the vehicle 100.

The other vehicular electronic devices 400 may further include an electronic device that receives power from the battery 200, in addition to the configuration shown in FIG. 3.

Figure 4:
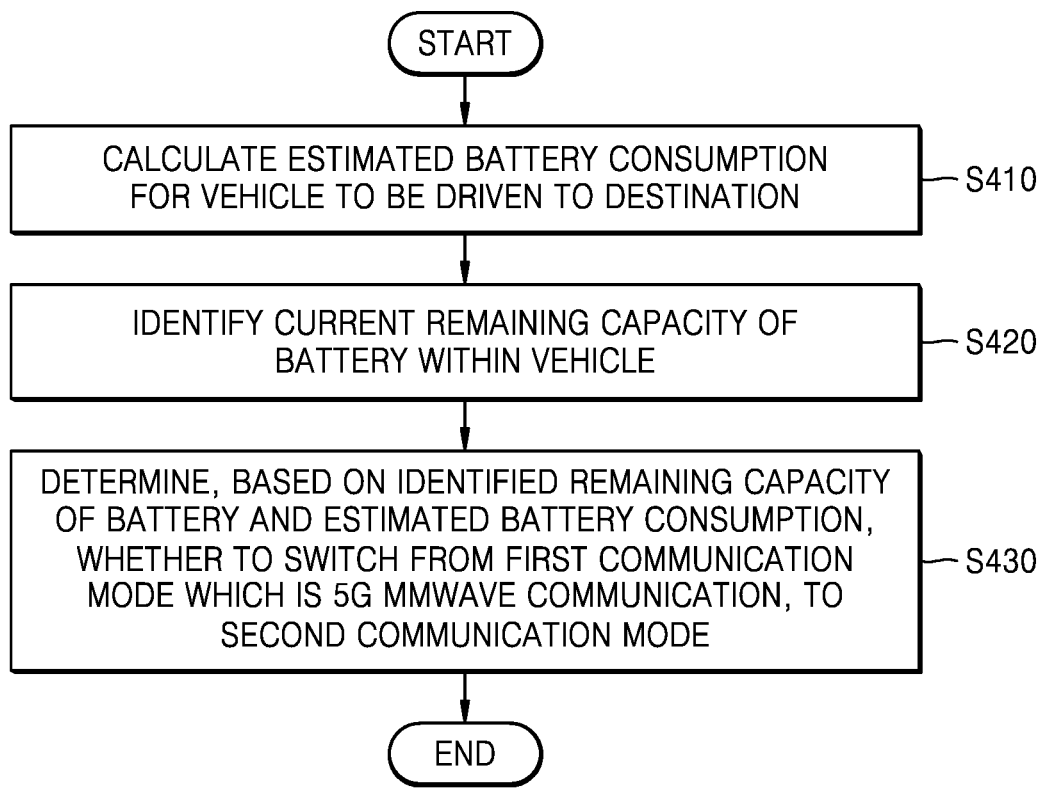
FIG. 4 is a flowchart of an operation method of an electronic device, according to an embodiment of the disclosure.

FIG. 4 is a flowchart of an operation method of the electronic device 1000, according to an embodiment of the disclosure.

In operation S410, the electronic device 1000 calculates an estimated battery consumption, which is total battery consumption expected for the vehicle (100 of FIG. 3) to be driven to a destination. The electronic device 1000 may receive a user input for inputting destination information via the navigation system (420 of FIG. 3), and set a destination based on the received user input. However, embodiments of the disclosure are not limited thereto, and the electronic device 1000 may store identification values for frequently visited destinations such as home, work, school, etc., location information of frequently visited destinations, and information about a time period when a destination is frequently visited, and automatically determine, by using a trained AI model, a destination according to a current location or time period (e.g., commuting time to and from work, commuting time to and from school, etc.).

The electronic device 1000 may calculate first estimated battery consumption, which is battery consumption expected for the power unit 300 of the vehicle 100 when traveling to the destination, based on a distance between an origin and a destination and a power consumption rate of the power unit (300 of FIG. 3), and second estimated battery consumption, which is battery consumption expected by the other vehicular electronic devices (400 of FIG. 3) operated by a passenger of the vehicle 100 while traveling to the destination.

When data communication is performed by each of a plurality of communication modules included in the RF communication module (1500 of FIG. 2), the electronic device 1000 may calculate third estimated battery consumption for driving the vehicle 100 to the destination. The electronic device 1000 may calculate estimated battery consumption, during an expected time to travel to the destination, for use of the 5G mmWave communication module (1520 of FIG. 2).

In operation S420, the electronic device 1000 identifies a current remaining capacity of the battery 200 in the vehicle 100. Here, the 'current remaining capacity' refers to the remaining capacity of the battery 200 at a time point when a destination for driving is set.

In operation S430, the electronic device 1000 determines, based on the identified remaining capacity of the battery 200 and the estimated battery consumption, whether to switch from a first communication mode that is 5G mmWave communication to a second communication mode. The electronic device 1000 may compare the estimated battery consumption calculated in operation S410 with the current remaining capacity of the battery 200 identified in operation S420, and determine, according to a result of the comparison, whether to switch a communication mode from the first communication mode to the second communication mode. The second communication mode may include one of 5G sub6, LTE, and 3G communication modes. An embodiment of the disclosure in which the electronic device 1000 determines whether to switch a communication mode based on a result of comparing a remaining capacity of the battery 200 with estimated battery consumption will be described in detail with reference to FIG. 5.

Figure 5:
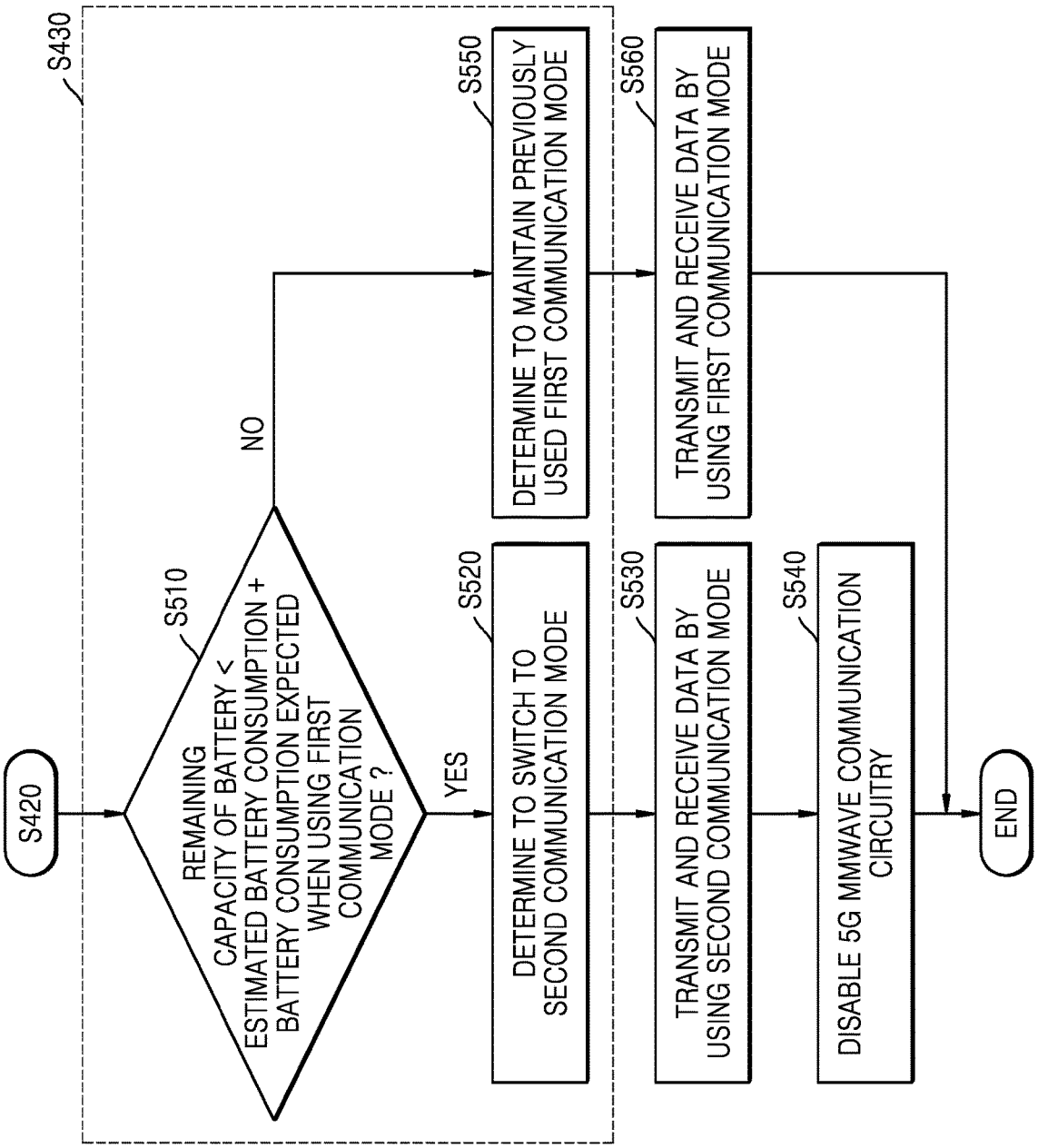
FIG. 5 is a flowchart of a method, performed by an electronic device, of determining whether to switch a communication mode based on a remaining capacity of a battery and estimated battery consumption, according to an embodiment of the disclosure.

FIG. 5 is a flowchart of a method, performed by the electronic device 1000, of determining whether to switch a communication mode based on a remaining capacity of the battery 200 and estimated battery consumption, according to an embodiment of the disclosure.

Operations S510, S520, and S550 shown in FIG. 5 are detailed operations of operation S430 shown in FIG. 4. Operation S510 shown in FIG. 5 is performed subsequently to operation S420 of FIG. 4. Operations S530, S540, and S560 shown in FIG. 5 are performed subsequently to operation S430 of FIG. 4.

In operation S510, the electronic device 1000 compares a remaining capacity of the battery 200 with estimated battery consumption and battery consumption required when using the first communication mode. In an embodiment of the disclosure, the first communication mode may be a 5G mmWave communication mode. The battery consumption required when using the first communication refers to battery consumption that is expected when using the 5G mmWave communication module 1510 when the vehicle 100 drives to the destination. The battery consumption when using the first communication mode may be calculated based on power consumption of the 5G mmWave communication module 1510 and time expected to be taken for driving the vehicle 100 to the destination.

When the current remaining capacity of the battery 200 is less than the sum of the estimated battery consumption and the expected battery consumption when using the first communication mode (operation S520), the electronic device 1000 determines to switch from the first communication mode to the second communication mode. The second communication mode may include one of 5G sub6, LTE, and 3G communication modes.

In operation S530, the electronic device 1000 transmits and receives data by using the second communication mode. The electronic device 1000 may control the RF communication module 1500 to transmit and receive data to and from a base station by using one of the 5G Sub6 communication module 1520, the LTE communication module 1530, and the 3G communication module 1540. The RF communication module 1500 may function as a communication relay for a mobile device of a passenger in the vehicle 100 via data communication with the base station. The electronic device 1000 may transmit data received from the base station to the passenger's mobile device via downlink of a communication connection between devices by using one of the 5G Sub6 communication module 1520, the LTE communication module 1530, and the 3G communication module 1540, and transmit data received from the mobile device to the base station via uplink.

In operation S540, the electronic device 1000 disables the 5G mmWave communication module 1510. In an embodiment of the disclosure, the electronic device 1000 may reduce battery consumption by cutting off power supplied to the 5G mmWave communication module 1510 or disabling an operation thereof. The electronic device 1000 may switch an operation mode of the 5G mmWave communication module 1510 to a power saving mode.

When the current remaining capacity of the battery 200 is greater than or equal to the sum of the estimated battery consumption and the battery consumption required when using the first communication mode (operation S550), the electronic device 1000 determines to maintain the existing first communication mode. The first communication mode is a 5G mmWave communication mode and may be set as a default setting value for RF communication.

In operation S560, the electronic device 1000 transmits and receives data by using the first communication mode. The electronic device 1000 may control the RF communication module 1500 to transmit and receive data to and from the base station via the 5G mmWave communication module 1510.

The electronic device 1000 may perform a function of a communication relay for a mobile device of a passenger in the vehicle 100 by using the 5G mmWave communication mode. The RF communication module 1500 may transmit data received from the base station to the passenger's mobile device via downlink of a communication connection between devices by using the 5G mmWave communication module 1510, and transmit data received from the mobile device to the base station via uplink.

Figure 6:
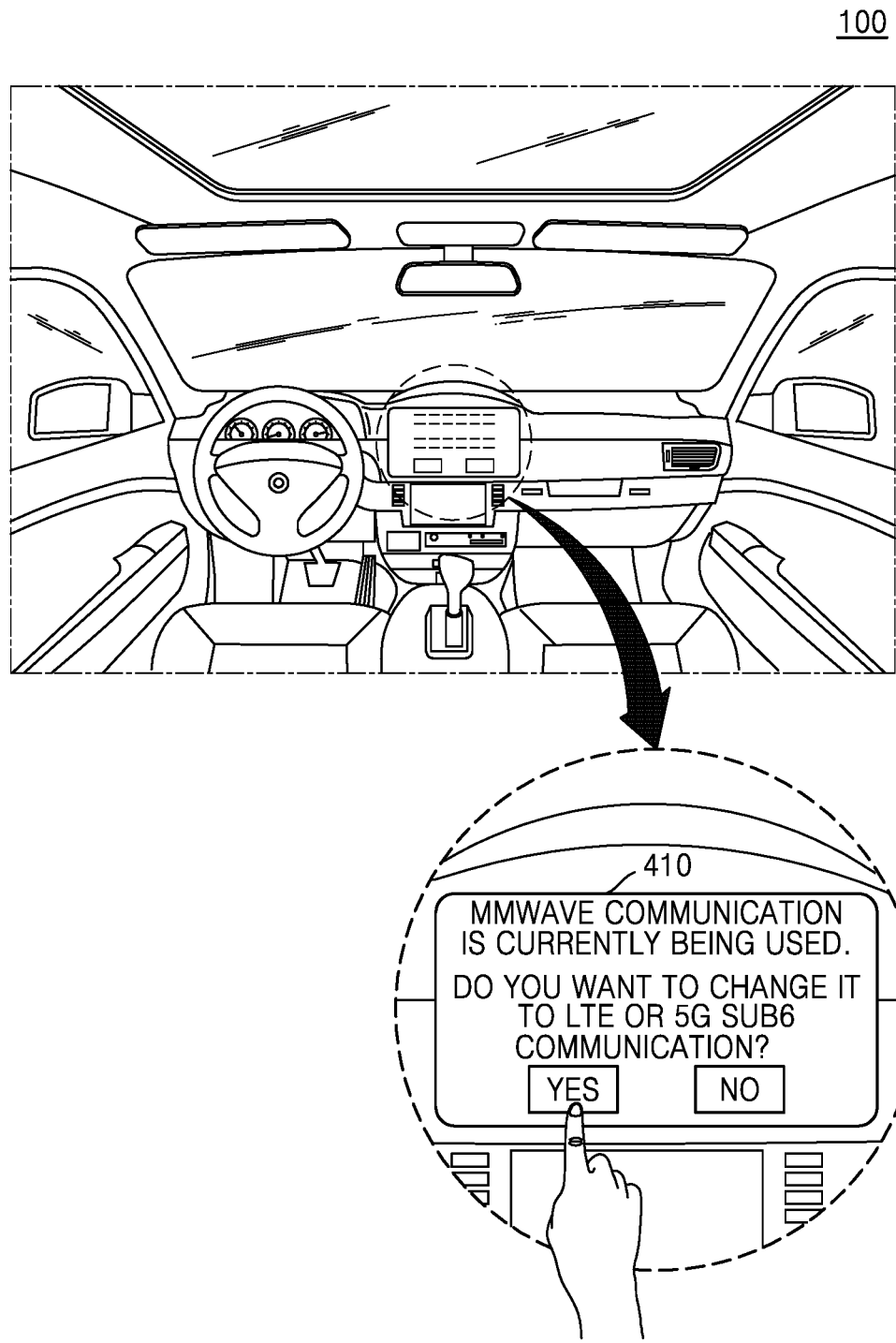
FIG. 6 is diagram of an embodiment of the disclosure in which an electronic device switches a communication mode according to a user input received via a user interface (UI).

FIG. 6 is diagram of an embodiment of the disclosure in which the electronic device 1000 switches a communication mode according to a user input received via a UI.

Referring to FIG. 6, the electronic device 1000 may determine whether to switch a communication mode based on a current remaining capacity of the battery 200 in the vehicle 100 and estimated battery consumption that is battery consumption expected to be required when the vehicle 100 is driven to a destination, and when the electronic device 1000 determines to switch the communication mode, output a notification user interface (UI) informing a user of whether to switch the communication mode. The electronic device 1000 may display, on a CID 410 inside the vehicle 100, a UI for receiving a user input for changing a communication mode. In the embodiment of the disclosure shown in FIG. 6, a UI including characters "mmWave communication is in current use. Do you want to change it to LTE or 5G sub6 communication?" may be displayed on the CID 410.

In the embodiment of the disclosure illustrated in FIG. 6, a communication mode change notification UI is displayed on the CID 410, but the disclosure is not limited thereto. In another embodiment of the disclosure, the electronic device 1000 may display a communication mode change notification UI via a head-up display (HUD) on a windshield of the vehicle 100 or a cluster display, or output the communication mode change notification UI in the form of a voice via a speaker or the like.

The electronic device 1000 may change the communication mode based on a user input received via a UI displayed on the CID 410. In an embodiment of the disclosure, a user input for changing a communication mode may be a touch input received via the CID 410, but is not limited thereto. In another embodiment of the disclosure, the electronic device 1000 may receive a user input via a button, a key pad, a trackball, a jog switch, a jog dial, or a knob inside the vehicle 100, and change the communication mode based on the received user input.

Figure 7:
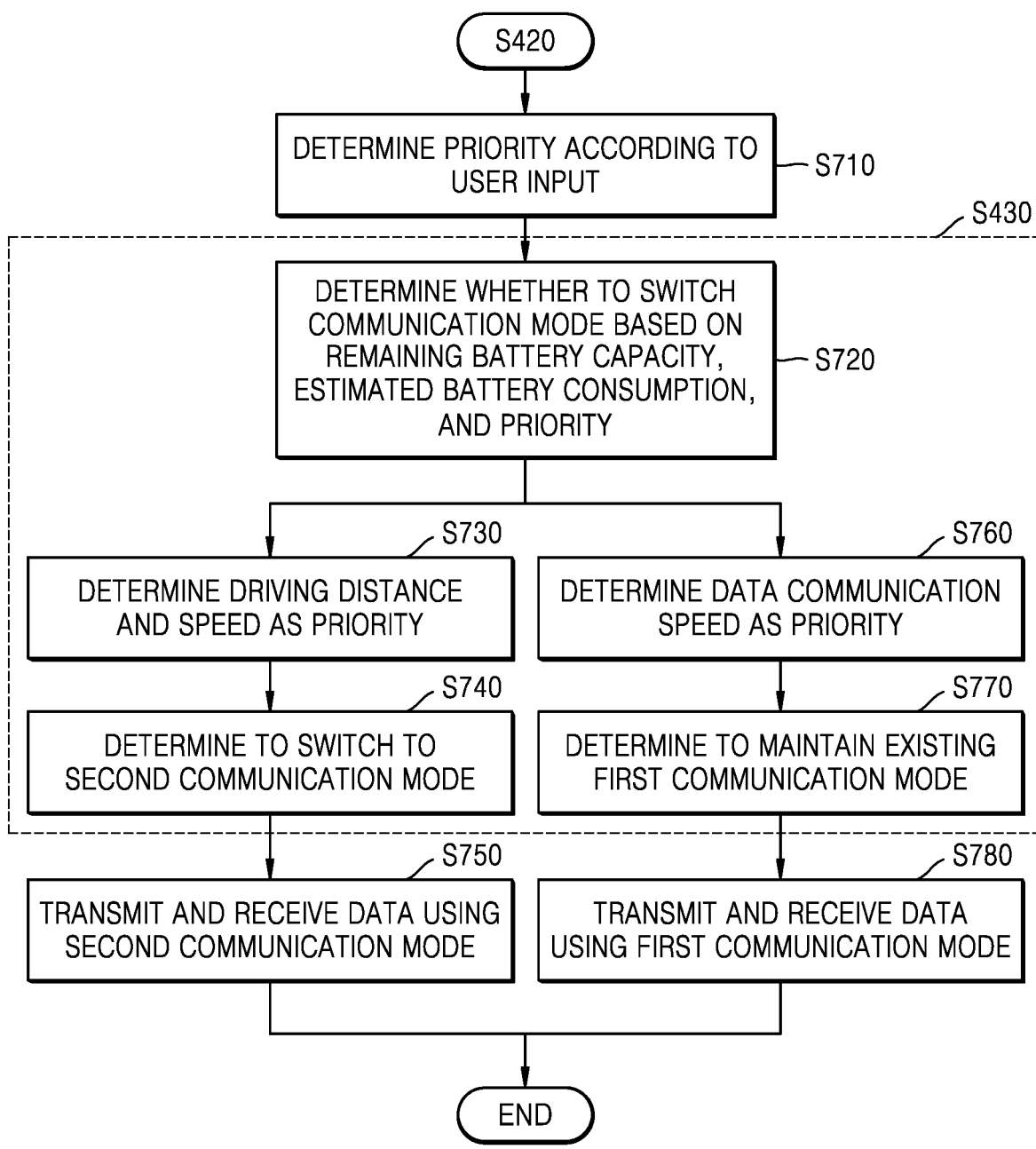
FIG. 7 is a flowchart of a method, performed by an electronic device, of switching a communication mode based on a priority, according to an embodiment of the disclosure.

FIG. 7 is a flowchart of a method, performed by the electronic device 1000, of switching a communication mode based on a priority, according to an embodiment of the disclosure.

Operations S720 through S740, S760, and S770 shown in FIG. 7 are detailed operations of operation S430 shown in FIG. 4. Operation S710 shown in FIG. 7 is performed subsequently to operation S420 of FIG. 4. Operations S750 and S780 shown in FIG. 7 are performed subsequently to operation S430 of FIG. 4.

In operation S710, the electronic device 1000 may determine a priority according to a user input. In an embodiment of the disclosure, the electronic device 1000 may determine a priority between driving of the vehicle 100 at a relatively low overall battery consumption rate, and data communication speed according to a user input. When driving of the vehicle 100 at a relatively low overall battery consumption rate is determined as a priority, this may allow the power unit (300 of FIG. 3) for driving the vehicle 100 to preferentially consume a remaining battery capacity, and secure a driving speed and a driving distance. When the data communication speed is determined as a priority, this may allow the 5G mmWave communication module (1520 of FIG. 2) to preferentially consume the remaining battery capacity such that driving while communicating using the 5G mmWave mode will occur at a relatively high overall battery consumption rate, and achieve high data rates and low latency.

In operation S720, the electronic device 1000 determines whether to switch a communication mode based on the remaining battery capacity, estimated battery consumption, and the priority. Because a method, performed by the electronic device 1000, of determining whether to switch a communication mode based on the remaining battery capacity and the estimated battery consumption is substantially the same as that described with reference to FIGS. 4 and 5, descriptions that are already provided above with respect to FIGS. 4 and 5 will be omitted.

In an embodiment of the disclosure, the electronic device 1000 may determine whether to switch the communication mode by adding a weight to the priority determined in operation S710. In detail, the electronic device 1000 may determine whether to switch the communication mode by assigning a weight to the priority determined between driving of the vehicle 100 and data communication speed rather than a relationship between the current remaining battery capacity and the estimated battery consumption for driving to the destination.

When the driving distance and the driving speed are determined as a priority (operation S730), the electronic device 1000 determines to switch the communication mode to a second communication mode (operation S740). The second communication mode may include one of 5G sub6, LTE, and 3G communication modes.

In operation S750, the electronic device 1000 transmits and receives data using the second communication mode. Because operation S750 is the same as operation S530 shown in FIG. 5, descriptions that are already provided above with respect to FIG. 5 will be omitted.

When the data communication speed is determined as a priority (operation S760), the electronic device 1000 determines to maintain the existing first communication mode (operation S770). The first communication mode is a 5G mmWave communication mode, and may be set as a default setting value.

In operation S780, the electronic device 1000 transmits and receives data using the first communication mode. Because operation S780 is the same as operation S560 shown in FIG. 5, descriptions that are already provided above with respect to FIG. 5 will be omitted.

In the embodiment of the disclosure shown in FIG. 7, the electronic device 1000 may determine in advance an operation mode desired by the user as a priority, e.g., which one among the driving distance and speed and data communication speed is to be determined as a priority, instead of automatically determining the communication mode according to the remaining battery capacity and the estimated battery consumption for driving to the destination, and then determine the communication mode according to the determined priority, thereby guaranteeing various options according to users and efficiently managing a battery capacity by reflecting the user's intention.

Figure 8:
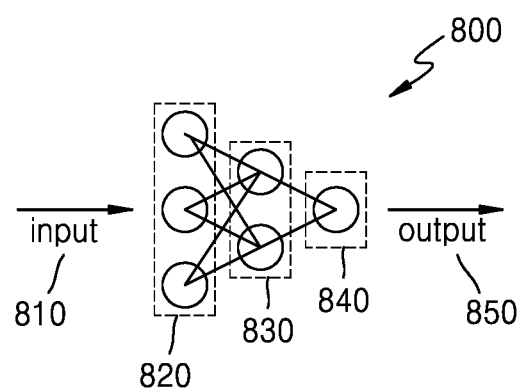
FIG. 8 is a diagram for describing an operation performed by an electronic device using artificial intelligence (AI) technology, according to an embodiment of the disclosure.

FIG. 8 is a diagram for describing a method performed by the electronic device 1000 using AI technology, according to an embodiment of the disclosure.

In the method of FIG. 8, one or more of the following operations may be performed by the electronic device 1000 using AI technology: i) calculating estimated battery consumption expected for driving to a destination, ii) identifying a current remaining capacity of the battery 200 in the vehicle 100, and iii) determining, based on the identified current remaining capacity of the battery 200 and the estimated battery consumption, whether to switch from a first communication mode in current use (e.g., 5G mmWave RF communication) to a second communication mode that consumes less power.

AI technology is a technology that obtains a desired result by performing processing such as analysis and/or classification on input data based on computations through a neural network.

The AI technology may be implemented using algorithms. In this case, an algorithm or a set of algorithms for implementing the AI technology are called the neural network. Here, the neural network may receive input data, perform computations for the analysis and/or the classification, and output resultant data. In order for the neural network to accurately output the resultant data corresponding to the input data in this way, training the neural network is needed. In this case, 'training' may mean teaching or developing the neural network to discover or learn by itself a method of analyzing pieces of input data taken in the neural network, a method of classifying the pieces of input data, and/or a method of extracting features necessary for generating resultant data from the pieces of input data. In detail, through a training process, the neural network may optimize weight values therein by being trained using training data (e.g., a plurality of different images). Then, a desired result is output by processing input data via the neural network having the optimized weight values.

When the neural network includes a plurality of hidden layers which are interior layers for performing computations, i.e., when a depth of the neural network where computations occur increases, the neural network may be classified as a deep neural network (DNN). Examples of a neural network may include, are not limited to, a convolutional neural network (CNN), a DNN, a recurrent neural network (RNN), a restricted Boltzmann machine (RBM), a deep belief network (DBN), a bidirectional recurrent DNN (BRDNN), and a deep Q-network (DQN). Furthermore, the neural network may be subdivided. Furthermore, a CNN may be subdivided into a deep CNN (DCNN), a capsule neural network (Capsnet) (not shown), or the like.

An 'AI model' may be a neural network including at least one layer operating to receive input data and output a desired result. Furthermore, the 'AI model' may refer to an algorithm or a set of a plurality of algorithms for performing computations via a neural network and outputting a desired result, a processor for executing the algorithm or set of algorithms, software for executing the algorithm or set of algorithms, or hardware for executing the algorithm or set of algorithms.

At least one of i) the operation of calculating estimated battery consumption that is battery consumption expected to be required when driving to the destination, ii) the operation of identifying the current remaining capacity of the battery 200 in the vehicle 100, or iii) the operation of determining, based on the identified current remaining capacity of the battery 200 and the estimated battery consumption, whether to switch from the first communication mode that is currently used 5G mmWave RF communication to the second communication mode may be performed based on the AI model.

Referring to FIG. 8, a neural network 800 may receive training data and be trained on the training data. In addition, the trained neural network 800 may receive input data 810 as an input to an input terminal 820, and the input terminal 820, a hidden layer 830, and an output terminal 840 may each perform a computation for analyzing the input data 810 and data from a previous layer and outputting output data 850. Although FIG. 8 shows that the hidden layer 830 is a single layer, this is merely an example, and the hidden layer 830 may be composed of a plurality of layers.

The neural network 800 may be trained to calculate first estimated battery consumption that is battery consumption expected to be required by a power unit of a vehicle when moving to a destination, and second estimated battery consumption that is battery consumption expected to be required by other vehicular electronic devices operated by a passenger while moving from an origin to the destination.

The neural network 800 may be trained to compare an identified current remaining battery capacity with the sum of calculated estimated battery consumption and battery consumption required when using a first communication mode, and determine, based on a result of the comparison, whether to maintain the first communication mode or switch a communication mode to a second communication mode.

The neural network 800 may be trained to determine to switch from the first communication mode to the second communication mode when the current remaining battery capacity is less than the sum of the estimated battery consumption and the battery consumption required when using the first communication mode.

The neural network 800 may be trained to disable an operation of the 5G mmWave communication module (1510 of FIG. 2) mounted on the vehicle when the first communication mode is switched to the second communication mode.

The neural network 800 may be trained to maintain the first communication mode when the current remaining battery capacity is greater than or equal to the sum of the estimated battery consumption and the battery consumption required when using the first communication mode.

The neural network 800 may be trained to monitor qualities of communication networks respectively using first and second communication modes and determine to switch from the first communication mode to the second communication mode based on a result of the monitoring.

The neural network 800 may be trained to determine whether to switch a communication mode based on an identified remaining battery capacity, estimated battery consumption, and a priority determined by the user.

Data or programs related to the neural network 800 for performing at least one of i) the operation of calculating estimated battery consumption that is battery consumption expected to be required when driving to the destination, ii) the operation of identifying the current remaining capacity of the battery 200 in the vehicle 100, or iii) the operation of determining, based on the identified current remaining capacity of the battery 200 and the estimated battery consumption, whether to switch from the first communication mode that is currently used 5G mmWave RF communication to the second communication mode may be stored in the memory (1400 of FIG. 2), training of the neural network 800 may be performed by the processor (1300 of FIG. 2).

Alternatively, the neural network 800 for performing at least one of i) the operation of calculating estimated battery consumption that is battery consumption expected to be required when driving to the destination, ii) the operation of identifying the current remaining capacity of the battery 200 in the vehicle 100, or iii) the operation of determining, based on the identified current remaining capacity of the battery 200 and the estimated battery consumption, whether to switch from the first communication mode that is currently used 5G mmWave RF communication to the second communication mode may be implemented in a separate device (not shown) or processor (not shown) distinguished from the electronic device 1000.

The above-described computation via the neural network 800 may also be performed by a server (2000 of FIGS. 9 and 10) capable of communicating with the electronic device 1000 through a wireless communication network, according to an embodiment of the disclosure. A communication between the electronic device 1000 and the server 2000 will be described with reference to FIGS. 9 and 10.

Figure 9:
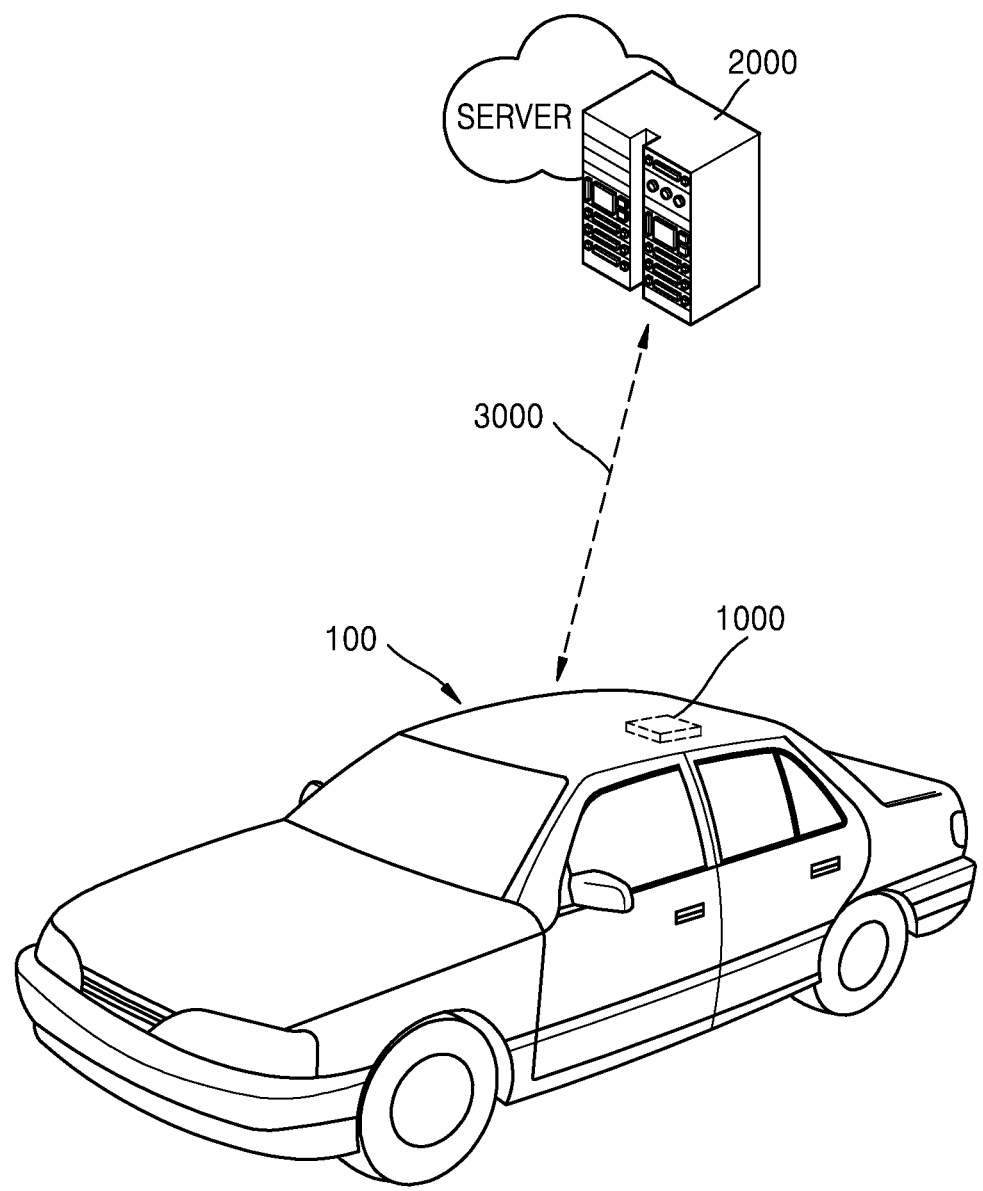
FIG. 9 is a diagram of an embodiment of the disclosure in which an electronic device operates in conjunction with a server.

FIG. 9 is a diagram of the electronic device 1000 operating in conjunction with the server 2000, according to an embodiment of the disclosure.

The server 2000 may transmit and receive data to and from the electronic device 1000 via a wireless communication network 3000, and process the data.

Figure 10:
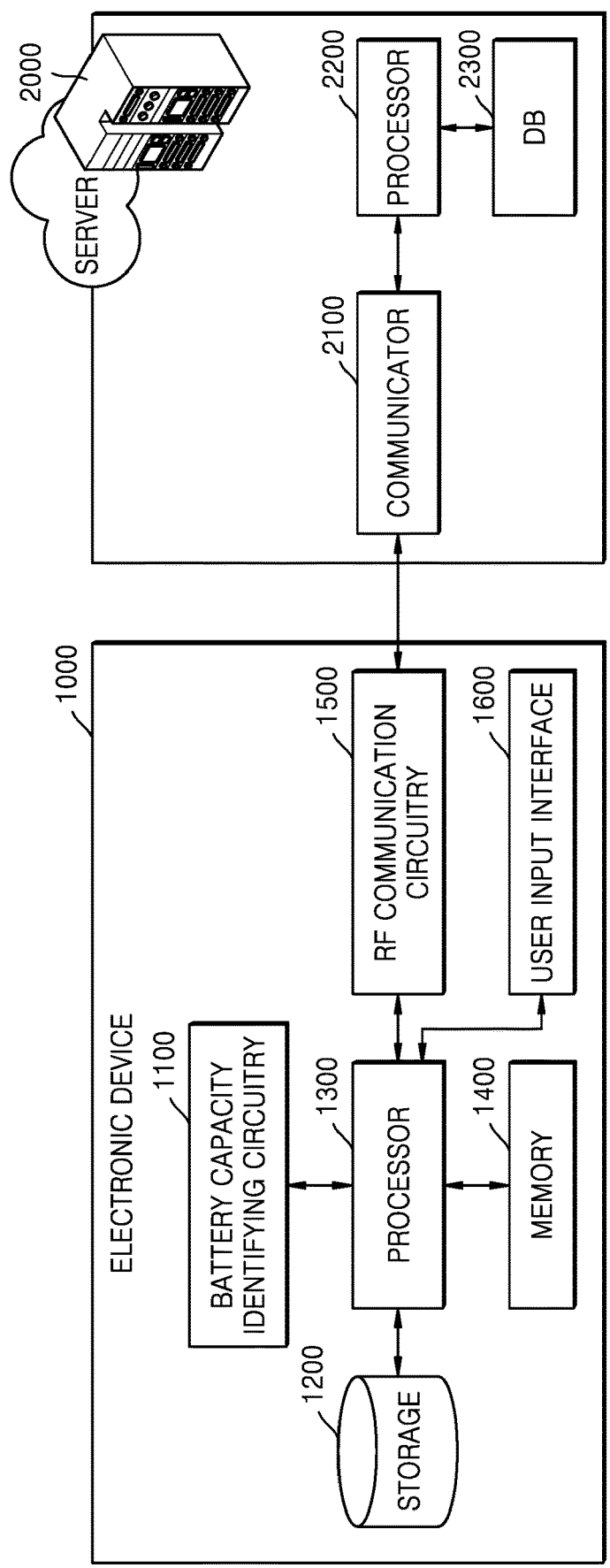
FIG. 10 is a diagram for describing the embodiment of the disclosure of FIG. 9 in detail.

Referring to FIGS. 9 and 10, the server 2000 may include a communicator 2100 communicating with the electronic device 1000, a processor 2200 for performing at least one instruction, and a database (DB) 2300.

The server 2000 may train an AI model and store the trained AI model. Furthermore, the server 2000 may use the trained AI model to perform at least one of i) the operation of calculating estimated battery consumption that is battery consumption expected to be required when driving to the destination, ii) the operation of identifying the current remaining capacity of the battery 200 in the vehicle 100, or iii) the operation of determining, based on the identified current remaining capacity of the battery 200 and the estimated battery consumption, whether to switch from the first communication mode that is currently used 5G mmWave RF communication to the second communication mode.

In general, the electronic device 1000 may have limited memory storage capacity, computation processing speed, training data collection capability, etc., compared to the server 2000. Thus, the server 2000 may perform an operation requiring storage of a large amount of data and a large number of computations, and then transmit necessary data and/or an AI model to the electronic device 1000 through a communication network. Then, the electronic device 1000 may receive and use the necessary data and/or the AI model via the server 2000 to thereby quickly and easily perform a necessary operation without a large capacity memory and a processor capable of performing fast computation.

The server 2000 may include the neural network 800 described with reference to FIG. 8.

FIG. 10 is a diagram for describing the embodiment of the disclosure of FIG. 9 in detail.

Referring to FIG. 10, the server 2000 may include the communicator 2100, the processor 2200, and the DB 2300.

The communicator 2100 communicates with an external device (e.g., a server) (not shown) through the wireless communication network (3000 of FIG. 9). Here, the external device may include a server (e.g., the server 2000) capable of performing at least one of computations required by the electronic device 1000 or transmitting data required by the electronic device 1000.

The communicator 2100 may include at least one communication module such as a short-range communication module, a wired communication module, a mobile communication module, and a broadcast receiving module. Here, the at least one communication module may include at least one of a tuner for performing broadcast reception or a communication module capable of performing data transmission and reception via a network that conforms to communication standards such as Bluetooth, wireless local area network (WLAN), (or Wi-Fi), wireless broadband (Wibro), World Interoperability for Microwave Access (Wimax), code division multiple access (CDMA), wideband CDMA (WCDMA), the Internet, 3G, 4G, 5G, and/or a communication method using 5G mmWave.

For example, when the communicator 2100 performs communication using 5G mmWave, a large amount of data may be quickly transmitted and received. In detail, the vehicle 100 may quickly receive a large amount of data using mmWave, and provide data necessary for safety of the vehicle 100 (e.g., data necessary for autonomous driving, data necessary for a navigation service, etc.), user content (e.g., movies, music, etc.), etc., thereby increasing the safety of the vehicle 100 and/or user convenience.

The mobile communication module included in the communicator 2100 may communicate with another device (e.g., the server 2000) located at a remote location via a communication network conforming to communication standards such as 3G, 4G, and/or 5G. Here, a communication module that communicates with another device located at a remote location may be referred to as a 'remote communication module'.

The processor 2200 controls all operations of the server 2000. For example, the processor 2200 may perform required operations by executing at least one instruction or program stored in the server 2000.

The DB 2300 may include a memory (not shown), and store, in the memory, at least one of at least one instruction, program, or data necessary for the server 2000 to perform a certain operation. Furthermore, the DB 2300 may store pieces of data necessary for the server 2000 to perform computations via a neural network.

The server 2000 may store the neural network 800 described with reference to FIG. 8. The neural network 800 may be stored in at least one of the processor 2200 or the DB 2300. The neural network 800 included in the server 2000 may be a trained neural network.

Furthermore, the server 2000 may transmit the trained neural network to the RF communication module 1500 of the electronic device 1000 via the communicator 2100. As a result, the electronic device 1000 may obtain and store the trained neural network, and obtain desired output data via the neural network.

A program executed by the electronic device 1000 described in this specification may be implemented as a hardware component, a software component, and/or a combination of the hardware component and the software component. A program may be executed by any system capable of executing computer-readable instructions.

Software may include a computer program, a piece of code, an instruction, or a combination of one or more thereof, and may configure a processing device to operate as desired or instruct the processing device independently or collectively.

The software may be implemented as a computer program including instructions stored in computer-readable storage media. Examples of the computer-readable recording media include magnetic storage media (e.g., ROM, RAM, floppy disks, hard disks, etc.), optical recording media (e.g., CD-ROM, DVD, etc.), etc. The computer-readable recording media may be distributed over computer systems connected through a network so that computer-readable code may be stored and executed in a distributed manner. The media may be read by a computer, stored in a memory, and executed by a processor.

A computer-readable storage medium may be provided in the form of a non-transitory storage medium. In this regard, the term 'non-transitory' only means that the storage medium does not include a signal and is a tangible device, and the term does not differentiate between where data is semi-permanently stored in the storage medium and where the data is temporarily stored in the storage medium.

Furthermore, programs according to embodiments of the disclosure may be included in the form of a computer program product when provided. The computer program product may be traded, as a product, between a seller and a buyer.

The computer program product may include a software program and a computer-readable storage medium having stored thereon the software program. For example, the computer program product may include a product (e.g. a downloadable application) in the form of a software program electronically distributed by a manufacturer of an electronic device 1000 or through an electronic market (e.g., Google Play Store™ and App Store™). For such electronic distribution, at least a part of the software program may be stored on the storage medium or may be temporarily generated. In this case, the storage medium may be a storage medium of a server of the manufacturer of the electronic device 1000, a server of the electronic market, or a relay server for temporarily storing the software program.

In a system including the electronic device 1000, the server (2000 of FIGS. 9 and 10), and another electronic device, the computer program product may include a storage medium of the server 2000 or a storage medium of the electronic device 1000. Alternatively, in a case where there is a third device (e.g., a smartphone) communicatively connected to the electronic device 1000, the computer program product may include a storage medium of the third device. Alternatively, the computer program product may include a software program itself that is transmitted from the electronic device 1000 to the third device or that is transmitted from the third device to the electronic device 1000.

In this case, one of the electronic device 1000 and the third device may execute the computer program product to perform methods according to embodiments of the disclosure. Alternatively, the electronic device 1000 and the third device may execute the computer program product to perform the methods according to embodiments of the disclosure in a distributed manner.

For example, the electronic device 1000 may execute the computer program product stored in the memory (1400 of FIG. 2) to control another electronic device communicatively connected to the electronic device 1000 to perform the methods according to embodiments of the disclosure.

As another example, the third device may execute the computer program product to control the electronic device 1000 communicatively connected to the third device to perform the methods according to embodiments of the disclosure.

In a case where the third device executes the computer program product, the third device may download the computer program product from the electronic device 1000, and execute the downloaded computer program product. Alternatively, the third device may execute the computer program product that is pre-loaded therein to perform the methods according to the embodiments of the disclosure.

While embodiments of the disclosure have been described with reference to the figures, it will be understood by those of ordinary skill in the art that various modifications and changes in form and details may be made from the above descriptions. For example, adequate effects may be achieved even when the above techniques are performed in a different order than that described above, and/or the aforementioned components such as computer systems or modules are combined or coupled in different forms and modes than those described above or are replaced or supplemented by other components or their equivalents.

What is claimed is:

1. An electronic device mountable on a vehicle, the electronic device comprising:
    battery capacity identifying circuitry configured to identify a remaining capacity of a battery that supplies power for driving the vehicle;
    radio frequency (RF) communication circuitry configured to perform data communication using at least one of a plurality of different communication modes;
    a memory storing at least one instruction; and
    a processor configured to execute the at least one instruction to:
        calculate estimated battery consumption for the vehicle to be driven to a set destination,
        identify, by using the battery capacity identifying circuitry, a current remaining capacity of the battery,
        compare the identified current remaining capacity of the battery with the calculated estimated battery consumption, which includes an expected battery consumption for use of a first communication mode,
        determine, based on a result of the comparing that the current remaining capacity of the battery is less than the calculated estimated battery consumption, to switch from the first communication mode currently in use, to a second communication mode that consumes battery power at a different rate than the first communication mode, and
        control the RF communication circuitry to perform data communication using the first or second communication mode according to a result of the determination,
    wherein the first communication mode is fifth generation millimeter wave (5G mmWave), and the second communication mode is one of 5G sub 6, long-term evolution (LTE), and third generation (3G) communication modes.

2. The electronic device of claim 1, wherein the processor is further configured to execute the at least one instruction to calculate first estimated battery consumption, which is battery consumption expected by a power unit of the vehicle when the vehicle moves to the set destination, and second estimated battery consumption, which is battery consumption expected by other vehicular electronic devices operated by a passenger while the vehicle moves from an origin to the set destination.

3. The electronic device of claim 1, wherein the processor is further configured to execute the at least one instruction to determine to switch from the first communication mode to the second communication mode when, as a result of the comparing, the current remaining capacity of the battery is less than the calculated estimated battery consumption.

4. The electronic device of claim 3, wherein the processor is further configured to execute the at least one instruction to disable an operation of 5G mmWave communication circuitry included in the RF communication circuitry, when switching from the first communication mode to the second communication mode.

5. The electronic device of claim 1, wherein the processor is further configured to execute the at least one instruction to determine to maintain the first communication mode when, as a result of the comparing, the current remaining capacity of the battery equals or exceeds the calculated estimated battery consumption for the vehicle to be driven to the set destination during the use of the first communication mode.

6. The electronic device of claim 1, wherein the processor is further configured to execute at least one further instruction read from the memory to:
    monitor qualities of communication networks respectively using the first and second communication modes, and
    determine whether to switch from the first communication mode to the second communication mode, or vice versa, based on a result of the monitoring.

7. The electronic device of claim 1, further comprising a user interface configured to receive a user input for determining a priority between driving of the vehicle with a relatively low overall battery consumption rate and data communication speed, wherein the processor is further configured to execute the at least one instruction to:
determine the priority based on the user input, and
determine whether to switch a communication mode based on the identified remaining capacity of the battery, the estimated battery consumption, and the priority.

8. An operation method of an electronic device mounted on a vehicle, the operation method comprising:
calculating estimated battery consumption for the vehicle to be driven to a destination;
identifying a current remaining capacity of a battery powering the vehicle;
comparing the identified current remaining capacity of the battery with the calculated estimated battery consumption, which includes an expected battery consumption for use of a first communication mode; and
determining, based on a result of the comparing that the current remaining capacity of the battery is less than the calculated estimated battery consumption, to switch from the first communication mode to a second communication mode that consumes battery power at a different rate than the first communication mode,
wherein the first communication mode is fifth generation millimeter wave (5G mmWave), and the second communication mode is one of 5G sub 6, long-term evolution (LTE), and third generation (3G) communication modes.

9. The operation method of claim 8, wherein the calculating of the estimated battery consumption comprises:
calculating first estimated battery consumption, which is battery consumption expected by a power unit of the vehicle for the vehicle to travel to the destination; and
calculating second estimated battery consumption, which is battery consumption expected by other vehicular electronic devices operated by a passenger while the vehicle travels from an origin to the destination.

10. The operation method of claim 8, wherein the determining of whether to switch from the first communication mode to the second communication mode comprises determining to switch from the first communication mode to the second communication mode when, as a result of the comparing, the current remaining capacity of the battery is less than a sum of the calculated estimated battery consumption and estimated battery consumption for use of the first communication mode.

11. The operation method of claim 8, further comprising:
disabling an operation of 5G mmWave RF communication circuitry mounted in the vehicle, when switching from the first communication mode to the second communication mode.

12. The operation method of claim 8, wherein the determining of whether to switch from the first communication mode to the second communication mode comprises determining to maintain the first communication mode when, as a result of the comparing, the current remaining capacity of the battery equals or exceeds a sum of the calculated estimated battery consumption and the estimated battery consumption for use of the first communication mode.

13. A computer program product comprising a computer-readable storage medium including instructions read and executed by an electronic device mounted on a battery powered vehicle, the instructions for:
calculating estimated battery consumption for the battery powered vehicle to be driven to a destination;
identifying a current remaining capacity of a battery; and
comparing the identified current remaining capacity of the battery with the calculated estimated battery consumption, which includes an expected battery consumption for use of a first communication mode; and
determining, based on a result of the comparing, whether to switch from the first communication mode, which is fifth generation (5G) millimeter wave (mmWave) RF communication in current use, to a second communication mode,
wherein the second communication mode is one of 5G sub 6, long-term evolution (LTE), and third generation (3G) communication modes.

14. An electronic device mountable on a vehicle and in communication with a remote server through a wireless communication network, the electronic device comprising:
battery capacity identifying circuitry configured to identify a remaining capacity of a battery that supplies power for driving the vehicle;
radio frequency (RF) communication circuitry configured to perform data communication using at least one of a plurality of different communication modes;
memory storing at least one instruction; and
at least one processor configured to execute the at least one instruction to:
calculate estimated battery consumption for the vehicle to be driven to a set destination; and
transmit the identified remaining capacity of the battery to the remote server;
wherein the remote server:
calculates estimated battery consumption and an expected battery consumption for use of a first communication mode,
determines, based at least in part on the identified remaining capacity of the battery and the calculated estimated battery consumption received thereon, whether to switch from a first communication mode currently in use, to a second communication mode that consumes battery power at a lower rate than the first communication mode, and
transmits a signal to the electronic device to perform data communication using the first or second communication mode according to a result of the determination that a current remaining capacity of the battery is less than the calculated estimated battery consumption,
wherein the first communication mode is fifth generation millimeter wave (5G mmWave), and the second communication mode is one of 5G sub 6, long-term evolution (LTE), and third generation (3G) communication modes.

* * * * *